United States Patent
Jain et al.

(10) Patent No.: US 12,282,380 B2
(45) Date of Patent: Apr. 22, 2025

(54) RETRIEVING DIAGNOSTIC INFORMATION FROM A PCI EXPRESS ENDPOINT

(71) Applicant: Microsoft Technology Licensing, LLC, Redmond, WA (US)

(72) Inventors: Vishal Jain, Bellevue, WA (US); Teague Curtiss Mapes, Woodinville, WA (US); Jonathan Kent Ross, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 17/926,078

(22) PCT Filed: May 18, 2021

(86) PCT No.: PCT/US2021/032935
§ 371 (c)(1),
(2) Date: Nov. 17, 2022

(87) PCT Pub. No.: WO2021/236618
PCT Pub. Date: Nov. 25, 2021

(65) Prior Publication Data
US 2023/0195552 A1    Jun. 22, 2023

(30) Foreign Application Priority Data
May 18, 2020   (NL) .................................... 2025607

(51) Int. Cl.
*G06F 11/07*   (2006.01)
(52) U.S. Cl.
CPC ...... *G06F 11/0772* (2013.01); *G06F 11/0745* (2013.01); *G06F 11/0778* (2013.01)

(58) Field of Classification Search
CPC ............. G06F 11/0745; G06F 11/0772; G06F 11/0778
See application file for complete search history.

(56) References Cited

U.S. PATENT DOCUMENTS 7,167,926 B1   1/2007   Boucher et al.
8,171,230 B2   5/2012   Freimuth et al.
(Continued)

OTHER PUBLICATIONS

"Writing Device Drivers in Oracle® Solaris 11.4", Retrieved From : https://docs.oracle.com/cd/E37838_01/pdf/E61061.pdf, Nov. 2020, 700 Pages.

(Continued)

*Primary Examiner* — Joseph R Kudirka
(74) *Attorney, Agent, or Firm* — Ray Quinney & Nebeker; James Bullough

(57) ABSTRACT

The present disclosure relates to systems, methods, and computer-readable media for facilitating efficient retrieval of diagnostic information from a computing endpoint that experiences a failure condition. For example, systems described herein may detect or otherwise identify a failure condition associating with the computing endpoint operating in an erroneous or unpredictable matter. Systems described herein may involve carving out a portion of memory on the computing endpoint that is accessible to a host system (e.g., a CPU). Systems described herein may further provide a discoverable resource that enables a host system to identify and collect the diagnostic data in response to identifying a failure condition in an efficient manner and without requiring that the computing endpoint be capable of responding to data requests.

17 Claims, 5 Drawing Sheets

(56) References Cited

U.S. PATENT DOCUMENTS

| | | |
|---|---|---|
| 8,645,594 B2 | 2/2014 | Foong et al. |
| 9,135,200 B2 | 9/2015 | Shao |
| 9,317,446 B2 | 4/2016 | Borikar |
| 9,361,123 B2* | 6/2016 | Belusar ................. G06F 9/4408 |
| 9,804,988 B1 | 10/2017 | Ayoub et al. |
| 10,467,179 B2 | 11/2019 | Li et al. |
| 10,521,365 B2 | 12/2019 | Bshara et al. |
| 11,226,755 B1* | 1/2022 | Douglass ............... G06F 3/0659 |
| 2008/0126879 A1 | 5/2008 | Tiwari et al. |
| 2015/0006962 A1 | 1/2015 | Swanson et al. |
| 2019/0340058 A1* | 11/2019 | Sasidharan ........... G06F 11/079 |

OTHER PUBLICATIONS

"Search Report Issued in Netherlands Patent Application No. N2025607", Mailed Date: Feb. 24, 2021, 9 Pages.

"International Search Report and Written Opinion Issued in PCT Application No. PCT/US21/032935", Mailed Date: Aug. 27, 2021, 10 Pages.

* cited by examiner

RETRIEVING DIAGNOSTIC INFORMATION FROM A PCI EXPRESS ENDPOINT

BACKGROUND

Recent years have seen rapid development in communication technology, particularly in the capabilities of electronic devices and sub-systems of electronic devices to connect and communicate with each other over a variety of connections and communication interfaces. For example, electronic devices may now communicate with one another over a variety of wired and wireless connections and communication layers. As electronic devices and communication technologies continue to develop, communication capabilities continue to expand to enable a greater number and variety of devices to communicate in a number of different ways.

As computing devices and systems continue to grow in complexity, a wide variety of hardware and/or software problems may arise. For example, many systems or sub-systems of one or more devices may experience a variety of failure conditions. In an effort to understand and troubleshoot conditions surrounding failure of hardware and/or software, electronic devices often collect diagnostic information. Conventional techniques for collecting diagnostic information, however, suffer from a number of problems and drawbacks.

For example, collecting diagnostic data for many software and/or hardware failures involve transmitting a significant quantity of data from one device to another (or from one sub-system to another). In many devices, connections and interfaces for communicating diagnostic information have slow throughput and/or limited bandwidth. As a result, transmission of diagnostic data often fails or results in delays in resuming normal operations of various devices and systems. In addition to delays in communication generally, many software and/or hardware failures prevent diagnostic information from being communicated or otherwise collected. As a result, conventional systems often fail to obtain diagnostic information associated with certain types of failures.

These and other problems exist with regard to accessing or otherwise communicating diagnostic information associated with a variety of failures.

DETAILED DESCRIPTION

Figure 1:
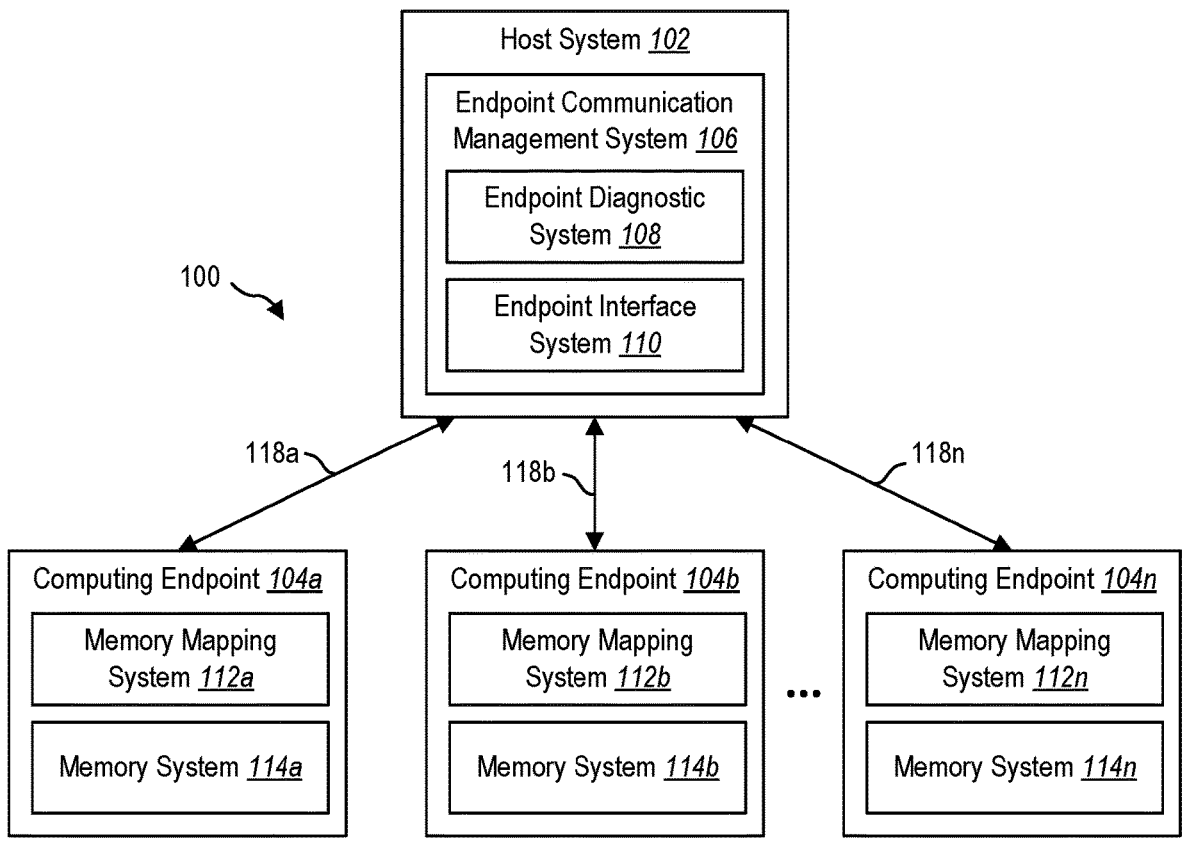
FIG. 1 illustrates an example environment including an endpoint communication management system for efficiently retrieving diagnostic information in accordance with one or more embodiments.

The present disclosure relates to an endpoint communication management system that facilitates efficient retrieval of diagnostic information from a computing endpoint (e.g., a peripheral component interconnect express (PCIe) endpoint) that experiences a failure condition. For example, in response to a computing endpoint or a particular sub-system of the computing endpoint experiencing a hardware and/or software failure, the endpoint communication management system implements features described herein that enables a host system to efficiently collect diagnostic information from a dedicated region of memory on the endpoint.

In particular, and as will be discussed in further detail below, the endpoint communication management system can selectively access a portion of memory on the computing endpoint to collect diagnostic information via a PCIe interface (or other similar type of communication interface). Moreover, the endpoint communication management system can collect the diagnostic information even where one or more relevant sub-systems on the computing endpoint are non-responsive to communications from the host system.

As an illustrative example, the endpoint communication management system can store an identifier of a memory register (e.g., a base address register (BAR)) on the computing endpoint where the memory register includes mapping information indicating a memory location of diagnostic data maintained on the computing endpoint. In addition, the endpoint communication management system can identify a failure condition of the computing endpoint in a variety of ways, which will be discussed in further detail below. In response to identifying the failure condition, the endpoint communication management system can access the mapping information and collect diagnostic data from the computing endpoint based on the mapping information from the memory register.

The present disclosure includes a number of practical applications that provide benefits and/or solve problems associated with conventional systems for retrieving diagnostic information from computing endpoints (e.g., PCIe endpoints and PCIe sub-systems). In particular, the endpoint communication management system provides specific features and functionalities that enable a host system to quickly retrieve diagnostic information via a PCIe communication link (or other high speed communication link) without requiring that the computing endpoint be fully responsive to requests from the host system.

For example, in one or more embodiments, a computing endpoint may generate or otherwise maintain a memory register (e.g., a base address register (BAR)) that includes mapping information associated with a location of diagnostic data on the computing endpoint. For instance, in one or more implementations, the computing endpoint may carve out a region of memory (e.g., a range of memory addresses or memory blocks) dedicated to a crash dump, memory dump, event log, or any other portion of diagnostic data created in the event of an identified failure condition. The endpoint communication management system may access the memory register to quickly and efficiently determine a location where diagnostic information is accessible.

As another example, the endpoint communication management system may access and collect diagnostic information via a higher-level connection between a host system and endpoint than typically performed by conventional systems. For example, where conventional systems may communicate or otherwise collect diagnostic information via a low speed or lower network layer side-band connection, features of the endpoint communication management system described herein enable a host system to collect diagnostic information via a PCIe link having a significantly higher bandwidth and throughput than side-band connections or other low speed or lower level network connections.

In addition to facilitating quick and efficient access to diagnostic information, the endpoint communication management system can further enable a host system to retrieve diagnostic information without requiring that the computing endpoint (or specific sub-systems of the computing endpoint) be responsive to communication requests from the host system. For example, by implementing a memory register (e.g., a BAR) as a discoverable resource to a host system, the host system can determine that a failure condition has occurred without receiving a communication of the failure condition from the computing endpoint. Rather, the endpoint communication management system may quickly and accurately determine that a failure condition has occurred based on an interrupt signal and/or based on the memory register being discoverable to the host system.

As illustrated in the foregoing discussion, the present disclosure utilizes a variety of terms to describe features and advantages of an endpoint communication management system within a variety of computing environments. Additional detail will now be provided regarding the meaning of some of these terms.

For example, as used herein, a "computing endpoint" or "endpoint" may refer to any computing device or subcomponent of a device coupled to and capable of communicating with a host system. For example, a computing endpoint may refer to a PCIe endpoint or PCIe endpoint sub-system capable of providing and receiving data via a PCIe electrical interface (e.g., a high-speed bus interface) between the endpoint and a host system. While one or more embodiments described herein relate specifically to PCIe endpoints capable of communicating based on PCIe standards, other implementations may involve any computing endpoint capable of communicating with a host system via a high-speed bus interface. Moreover, the computing endpoint may refer to PCIe endpoints that communicate accordance to multiple versions of PCIe standards.

As used herein, a "host system" may refer to any network device capable of communicating with one or multiple computing endpoints. In one or more embodiments described herein, a host system refers to a processing unit (e.g., a central processing unit (CPU)) including instructions thereon that, when executed, implement features and functionality of the endpoint communication management system described herein. The host system may be implemented within the same device as the computing endpoint (e.g., where the computing endpoint is a sub-system of an electronic device that additionally includes the host system). Alternatively, the host system may be implemented on a different device as the computing endpoint. In one or more implementations, the host system may communicate with multiple computing endpoints on the same device (e.g., multiple sub-systems on a common network device).

As used herein, a "memory register" may refer to a set of mapping data maintained on a computing endpoint. In one or more embodiments described herein, a memory register refers to a discoverable resource on a computing endpoint that is accessible (or discoverable) by the host system. In one or more implementations, the memory register refers to a base address register (BAR) including mapping information for a memory on a PCIe endpoint. As will be discussed in further detail below, a memory register may include mapping information in addition to translation information that enables a computing endpoint to store or otherwise maintain diagnostic information at a designated location within a memory system in addition to enabling the host system to accurately identify the location of the diagnostic information.

As used herein, a "failure condition" may refer to any scenario or condition of a computing endpoint that causes the computing endpoint to store diagnostic information. As an example, a failure condition may refer to a detected failure of some functionality of the computing endpoint that causes the computing endpoint to determine that the endpoint or sub-system of the endpoint is not functioning correctly. As another example, a failure condition may refer to a failure of the computing endpoint or sub-system of the computing endpoint to respond to one or more requests or communications from the host system. Indeed, the failure condition may refer to any detectable or otherwise identifiable condition of the computing endpoint that causes some feature or functionality of the computing endpoint to operate incorrectly or in an unpredictable way (e.g., where the host system and/or computing endpoint cannot accurately determine that the computing endpoint is operating correctly).

As used herein, "diagnostic data" or "diagnostic information" may refer interchangeably to any information or data that the computing endpoint may store in response to an identified failure condition. In one or more embodiments, diagnostic information may refer to a snapshot of a memory system at a time corresponding to identification of the failure condition. Alternatively, the diagnostic information may refer to a snapshot of a memory system at a most recent time when the computing endpoint was operating correctly. In one or more embodiments, the computing endpoint generates diagnostic data in response to the identified failure condition. Alternatively, the computing endpoint may periodically generate diagnostic data (e.g., at regular intervals). In one or more embodiments, diagnostic data may refer to a memory dump. As mentioned above, and as will be discussed in further detail below, the diagnostic data may be maintained at a specific location within a memory system of the computing endpoint (e.g., based on mapping information from the memory register).

Additional detail will now be provided regarding an endpoint communication management system in relation to illustrative figures portraying example implementations. For example, FIG. 1 illustrates an example environment 100 including a host system 102 and a plurality of computing endpoints 104a-n. As discussed above, the host system 102 may refer to a processing unit (e.g., a central processing unit) of a computing device (e.g., a client device, server device, network device).

In addition, and as discussed above, the computing endpoints 104a-n may refer to a variety of different computing endpoint types. By way of example, the computing endpoints 104a-n may refer to a variety of endpoints such as a graphics processing unit (GPU), a storage controller, a network adapter, a processing accelerator, or sub-system of a computing device. In one or more embodiments, the computing endpoints 104a-n include any number of computing endpoints that are capable of communicating with the host system 102 via one or more communication links 118a-n (e.g., high speed bus interfaces) or other individual interface between the computing endpoint(s) and host system 102. Additional description in connection with general features and functionality of the host system 102 and/or computing endpoints 104a-n is discussed below in connection with FIG. 5.

As illustrated in FIG. 1, the host system 102 may include an endpoint communication management system 106. As further shown, the endpoint communication management system 106 may include an endpoint diagnostic system 108 and an endpoint interface system 110. The endpoint diagnostic system 108 and the endpoint interface system 110 may cooperatively perform one or more features of the endpoint communication management system 106 implemented on the host system 102.

For example, and as will be discussed in further detail below in connection with FIG. 2, the endpoint diagnostic system 108 may implement features and functionality related to discovering each of the computing endpoints 104a-n, determining whether a failure condition applies to one or more of the computing endpoints 104a-n, and initiating collection of diagnostic data in accordance with one or more embodiments. In addition, and as will be discussed in further detail below, the endpoint interface system 110 may implement features related to registering mapping data (e.g., a memory register) for each of the computing endpoints and collecting diagnostic data via interface hardware. Each of the endpoint diagnostic system 108 and the endpoint interface system 110 will be discussed in further detail below in connection with FIG. 2.

As mentioned above, and as shown in FIG. 1, the environment 100 further includes a number of computing endpoints 104a-n including systems and components thereon. For example, a first computing endpoint 104a may include a memory mapping system 112a and a memory system 114a. The memory mapping system 112a may generate or otherwise maintain a memory register including mapping information for the corresponding computing endpoint 104a. In particular, the memory mapping system 112a can create, update, or otherwise maintain information indicating locations within the memory system 114a where diagnostic memory is stored on the computing endpoint 104a.

The memory system 114a may similarly implement features and functionality related to reading, writing, storing, or otherwise processing data on memory and/or storage of the computing endpoint 104a. For example, the memory system 114a may include a combination of processing hardware, memory, and other mid to high level processing components. In one or more embodiments described herein, the memory system 114a of the computing endpoint 104a includes a combination of volatile and non-volatile storage. As will be discussed in connection with one or examples described herein, the memory system 114a can create and store diagnostic information in response to detecting or otherwise experiencing a failure condition.

As shown in FIG. 1, the environment 100 may include additional computing endpoints 104b-n having similar components as the first computing endpoint 104a. For example, the additional computing endpoints 104b-n may include memory mapping systems 112b-n for generating and maintaining a memory register including mapping information for each of the additional computing endpoints 114b-n. In addition, the additional computing endpoints 104b-n may include memory systems 114b-n for implementing features related to reading, writing, storing, or otherwise processing data on memory and/or storage of the computing endpoints 104b-n.

As shown in FIG. 1, each of the computing endpoints 104a-n may be communicatively linked or otherwise connected to the host system 102 via communication links 118a-n. The communication links 118a-n may refer to one or a combination of connections (e.g., wired or wireless) over which the computing endpoints 104a-n can communicate data to and from the host system 102. In one or more embodiments, the communication links 118a-n couple to components of the host system 102 via a PCIe interface. For example, in one or more implementations, the communication links 118a-n may provide a high-speed connection between the computing endpoints 104a-n and a root complex of the endpoint communication management system 106.

Figure 2:
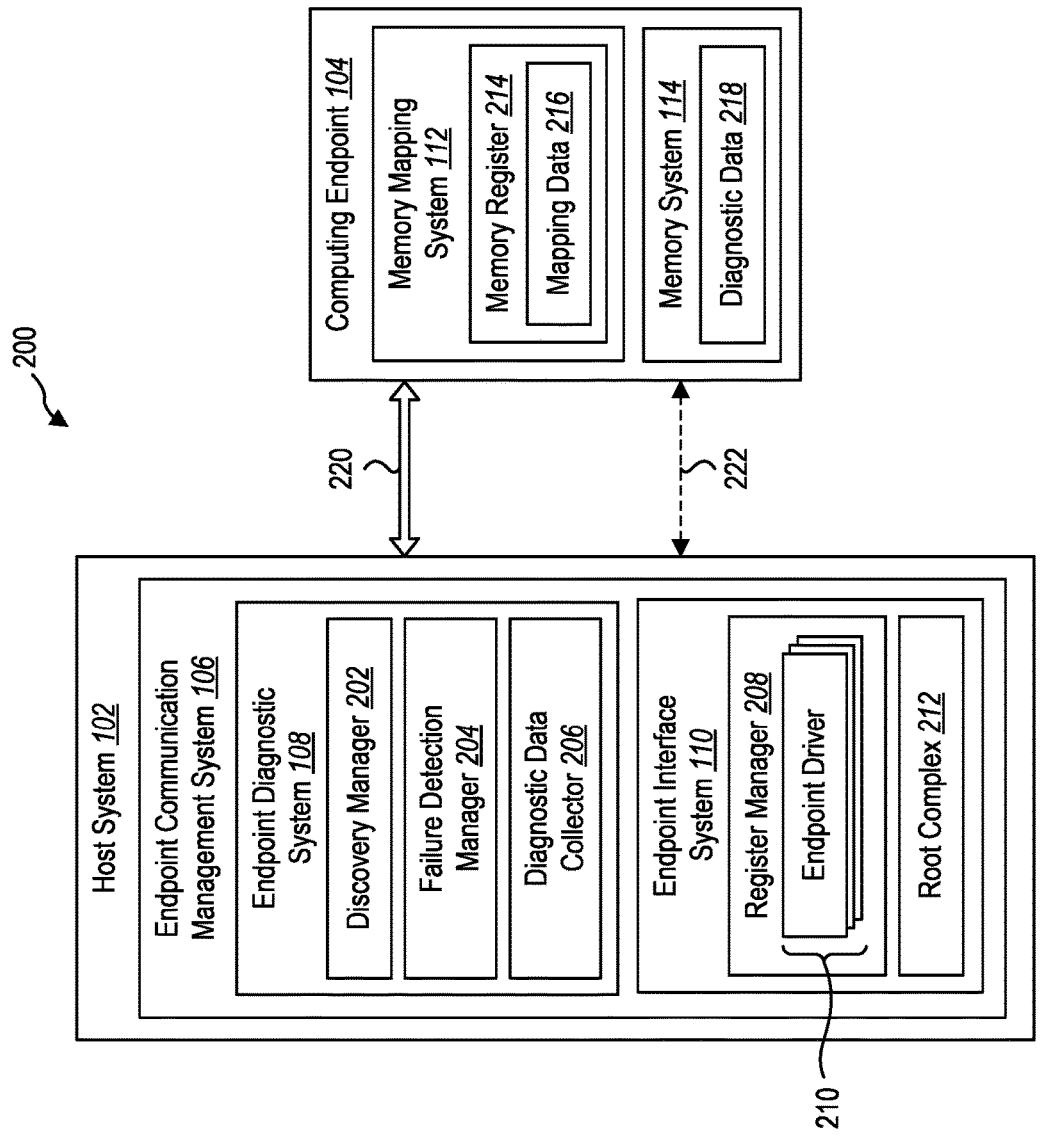
FIG. 2 illustrates an example interface between a host system and a computing endpoint for retrieving diagnostic information associated with a failure of the computing endpoint in accordance with one or more embodiments.

FIG. 2 illustrates an example environment 200 showing a more detailed implementation of the endpoint communication management system 106 on a host system 102 in communication with an example computing endpoint 104. In one or more embodiments described herein, the computing endpoint 104 refers specifically to a PCIe endpoint that communicates with the host system 102 (e.g., a CPU) via a PCIe interface using PCIe standards and protocols. Nevertheless, while one or more examples described herein relate specifically to a host system 102 in communication with one or more PCIe endpoints, features and functionality described herein may similarly relate to other types of computing endpoints in communication with the host system 102 via a comparable point-to-point (P2P) framework.

Similar to examples described in FIG. 1, the endpoint communication management system 106 may include an endpoint diagnostic system 108 and an endpoint interface system 110. As shown in FIG. 2, the endpoint diagnostic system 108 may include a discovery manager 202, a failure detection manager 204, and a diagnostic data collector 206. As further shown, the endpoint interface system 110 includes a register manager 208 having a plurality of endpoint drivers 210 implemented thereon. The endpoint interface system 110 may additionally include a root complex 212 including features and functionality for enabling components of the host system 102 to communicate with components of the computing endpoint 104.

As mentioned above, the environment 200 may include a computing endpoint 104 in communication with the host system 102. The computing endpoint 104 may be an example of any of the computing endpoints 104a-n discussed above in connection with FIG. 1 and may include a memory mapping system 112 and a memory system 114 thereon. The memory mapping system 112 may include a memory register 214 having mapping data 216. In one or more embodiments, the memory mapping system 112 includes other components, such as an address translation unit for translating requests or communications from the host system 102. As further shown, the memory system 114 may include diagnostic data 218 thereon.

As shown in FIG. 2, the host system 102 and the computing endpoint 104 may be in communication via one or more communication links. In one or more embodiments, the host system 102 and the computing endpoint 104 are connected via multiple communication links 220-222 that provide different mechanisms for communicating data between the respective devices. Each of the communication links 220-222 may have different throughputs and/or bandwidths and may utilize different protocols or network layers for communicating between the devices.

For example, a first communication link 220 may refer to a high-speed connection while the second communication link 222 refers to a lower speed connection (e.g., relative to the first communication link 220) between the host system 102 and the computing endpoint 104. For instance, the first communication link 220 may refer to a high-layer network link while the second communication link 222 refers to a lower-layer network link (relative to a network layer of the first communication link 220) between the devices. In one or more embodiments the respective links 220-222 refer to connections via respective data buses (e.g., a high-speed bus and a low speed bus) over which data may be communicated between the devices.

In one or more embodiments described herein, the first communication link 220 refers specifically to a PCIe communication link that enables the host system 102 and computing endpoint 104 to communicate via a PCIe interface implemented on or otherwise connected to the host system 102. In this example, the second communication link 222 may refer to a side-band channel (e.g., an I2C connection) or any communication channel having a lower throughout and bandwidth than the PCIe communication link.

Additional detail will now be provided in connection with components illustrated in FIG. 2. For example, as mentioned above, the endpoint diagnostic system 108 may include a discovery manager 202. The discovery manager 202 may implement a discovery process between the host system 102 and the computing endpoint 104. For example, upon starting up the host system 102 and/or connecting the computing endpoint 104 to the host system 102, the discovery manager 202 can exchange information between the host system 102 and the computing endpoint 104 to enable components of the respective devices and systems to communicate.

For example, in one or more embodiments, the discovery manager 202 accesses, receives, or otherwise discovers an identifier of the computing endpoint 104 for use in identifying the memory register 214 of the computing endpoint 104. In one or more embodiments, the discovery manager 202 exchanges address information between the two devices. For example, the discovery manager 202 may provide a source address of the host system 102 for use in recognizing the host system 102 at a later time when the host system 102 attempts to access diagnostic data 218 on the memory system 114. The discovery manager 202 may similarly receive a destination address corresponding to the computing endpoint 104 for use in recognizing and discovering resources of the computing endpoint 104.

In one or more embodiments, performing the discovery process involves loading an endpoint driver corresponding to the computing endpoint 104. As shown in FIG. 2, the register manager 208 may load any number of endpoint drivers 210 for any number of corresponding computing endpoints. An endpoint driver from the plurality of endpoint drivers 210 may include instructions specific to the computing endpoint 104 (or similar computing endpoint types). For example, the endpoint driver may include discovery information indicating a convention that the memory register 214 will use for the diagnostic data 218.

As further shown in FIG. 2, the endpoint diagnostic system 108 includes a failure detection manager 204. The failure detection manager 204 may identify a failure condition of the computing endpoint 104 in a variety of ways. For example, the failure detection manager 204 may receive an indication from the computing endpoint 104 indicating that the computing endpoint 104 has self-diagnosed or detected some failure condition. In addition, or as an alternative, the failure detection manager 204 can access one or more discoverable resources (e.g., the memory register 214) on the computing endpoint 104 to detect or otherwise identify a failure condition.

As a first non-limiting example, in one or more embodiments, the failure detection manager 204 periodically checks to determine whether the computing endpoint 104 has experienced a failure condition. For instance, the failure detection manager 204 can determine whether a crash dump has taken place and that diagnostic data 218 has been recently updated or stored in an allocated portion of memory. Where the computing endpoint 104 has recently performed a crash dump (e.g., at an unscheduled or unexpected time), the failure detection manager 204 can determine that a failure condition exists. As used herein, a crash dump may refer to a memory dump, crash dump, or other instance in which the computing endpoint 104 has captured a state of memory on the memory system 114.

As a second non-limiting example, the failure detection manager 204 may determine that a failure condition has occurred based on information provided by the computing endpoint 104. For example, in one or more embodiments, the computing endpoint 104 may determine that a sub-system or other components of the computing endpoint 104 is not operating correctly (e.g., the computing endpoint 104 may not be able to accurately determine that the sub-system or component is operating correctly). In response, the computing endpoint 104 may provide a signal (e.g., an interrupt signal) to the host system 102 to indicate that a failure condition has occurred.

In one or more embodiments described herein, the failure detection manager 204 may determine that a failure condition applies without requiring that the computing endpoint 104 is responsive to the host system 102. For example, while one or more embodiments may involve receiving an indication of a self-diagnosed failure condition, there may be scenarios in which a failure condition prevents the computing endpoint 104 from responding to requests of the host system 102 and/or where the computing endpoint 104 is unable to communicate an indication that the failure condition has occurred.

In one or more embodiments, the failure detection manager 204 may perform a combination of the above actions for determining that a failure condition exists. For example, where computing endpoint 104 is responsive (e.g., the failure condition does not prevent the computing endpoint 104 from communicating the indication of failure via the first and/or second communication links 220-222), the failure detection manager 204 may determine that the failure condition applies based on data received from the computing endpoint 104. Alternatively, where the computing endpoint 104 is non-responsive (e.g., fails to respond to a request from the host system 102 or cannot communicate) or where the failure condition disables the computing endpoint 104 from transmitting data to the host system 102 via the first communication link 220 (or second communication link 222), the failure detection manager 204 may periodically access one or more discoverable resources to determine whether the failure condition applies.

In each of the above examples, the endpoint communication management system 106 may utilize hardware of the host system 102 that is configured or otherwise equipped to communicate with the computing endpoint 104. For example, where the computing endpoint 104 refers to a PCIe endpoint, the endpoint communication management system 106 may communicate with the computing endpoint 104 via the root complex 212. The root complex 212 may include a variety of switches, multiplexers, ports (e.g., root ports) and other hardware that enable the host system 102 to communicate with one or multiple PCIe endpoints. The root complex 212 may enable components of the endpoint communication management system 106 to communicate with a variety of different types of computing endpoints 104. As mentioned above, while one or more embodiments described herein relate specifically to a root complex 212 in a PCIe framework, the host system 102 may utilize other implementations of hardware that facilitate communication between a host system 102 and a variety of different types of computing endpoints.

As further shown, the endpoint diagnostic system 108 may include a diagnostic data collector 206. In response to detecting or otherwise identifying a failure condition, the diagnostic data collector 206 can access the diagnostic data 218 on the memory system 114. In particular, the diagnostic data collector 206 can access the memory register 214 to identify mapping data 216. In one or more embodiments, the diagnostic data collector 206 accesses the memory register 214, which uses an address translation unit to indicate a destination or location of the diagnostic data 218 on the memory system 114.

Upon identifying the location of the diagnostic data 218, the diagnostic data collector 206 can access the specific region of memory in a direct way. For example, in one or more implementations, the diagnostic data collector 206 collects the diagnostic data 218 without providing a specific request that the computing endpoint 104 provide the diagnostic data 218. Rather, the diagnostic data collector 206 can simply access the diagnostic data 218 at the discovered memory location to retrieve a crash dump for storage on the host system 102 (or other storage resource). Indeed, the diagnostic data collector 206 can perform this data retrieval even where the computing endpoint 104 is non-responsive to requests from the host system 102 (e.g., such as where a direct memory access engine of the computing endpoint 104 has gone down or is otherwise malfunctioning).

Similar to the process of diagnosing the failure condition based on data accessed or received via the first communication link 220, the diagnostic data collector 206 can collect the diagnostic data 218 via the first communication link 220. In one or more embodiments, the diagnostic data collector 206 collects the diagnostic data 218 independent from a responsiveness of the computing endpoint 104 and without requiring that the computing endpoint 104 actively transmit the diagnostic data 218 (e.g., based on a data request from the host system 102). Instead, the diagnostic data collector 206 can identify the diagnostic data 218 based on the known location of the diagnostic data 218 on the memory system 114 and receive (e.g., retrieve) the diagnostic data 218 via the first communication link 220 (e.g., rather than a sideband or low speed channel such as the second communication link 222).

Additional detail will now be given in connection with an example implementation in which the host system 102 interacts with the computing endpoint 104 to collect diagnostic data in accordance with one or more embodiments described herein. For example, FIG. 3 illustrates a series of actions and interactions that may take place between the host system 102 and the computing endpoint 104 (e.g., a PCIe endpoint) in accordance with examples described herein.

Figure 3:
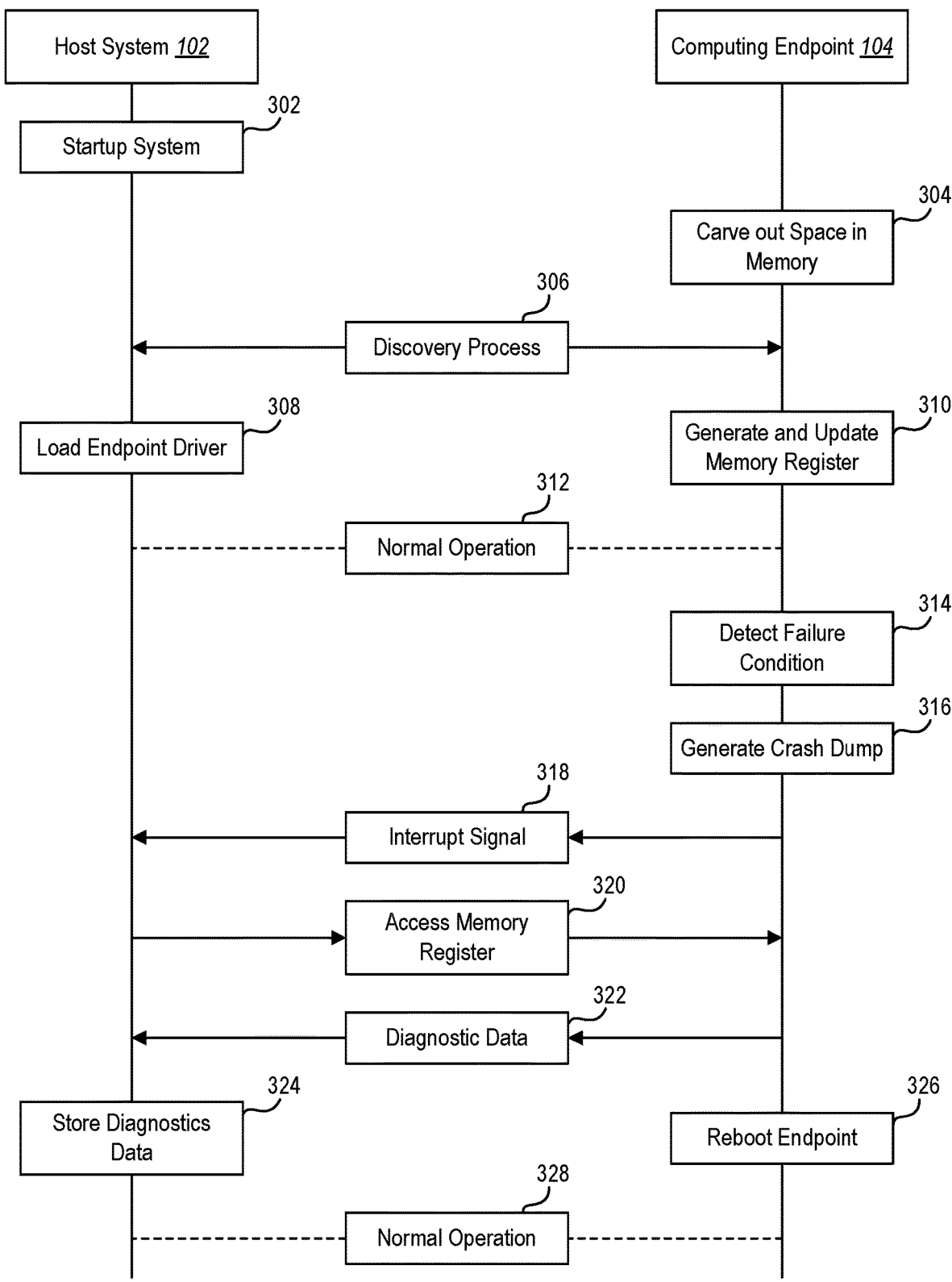
FIG. 3 illustrates an example implementation of identifying a failure condition and retrieving diagnostic information associated with the failure condition in accordance with one or more embodiments.

As shown in FIG. 3, the host system 102 can perform an act 302 of starting up the host system 102. Starting up the host system 102 may include turning on a device that includes the host system 102 (and/or the computing endpoint 104). Starting up the host system 102 may include opening a program or application configured to interact with and/or utilize functionality of the computing endpoint 104. In one or more embodiments, starting up the system includes initiating a connection with the computing endpoint 104 (e.g., establishing a physical and/or virtual connection with the computing endpoint 104).

As further shown in FIG. 3, the computing endpoint 104 can perform an act 304 of carving out space in memory. For example, the computing endpoint 104 can allocate a physical portion of memory on the computing endpoint 104 to be used for storing a crash dump on the memory system of the computing endpoint 104. In one or more embodiments, the computing endpoint 104 sets aside a range of memory addresses that are excluded from use by one or more additional programs on the computing endpoint 104 and/or host system 102. The computing endpoint 104 can store the allocated memory data and any additional mapping data on a memory register of the computing endpoint 104.

As shown in FIG. 3, the host system 102 and the computing endpoint 104 can cooperatively perform an act 306 of a discovery process. In particular, the host system 102 and computing endpoint 104 may communicate data over an established connection (e.g., a PCIe communication link or sideband channel) to inform each of the respective devices and/or sub-systems on how to communicate or otherwise actuate various functionalities of one another.

In one or more embodiments, the host system 102 discovers any number of computing endpoints connected to the host system 102. In one or more implementations, the discovery process may include the host system 102 receiving an identifier of the computing endpoint 104 or other identifier that indicates capabilities of the computing endpoint 104. In one or more embodiments, the host system 102 identifies the computing endpoint 104 based on the set of capabilities associated with the identifier of the computing endpoint 104.

As shown in FIG. 3, the host system 102 can perform an act 308 of loading an endpoint driver. The endpoint driver may refer to a software driver that includes instructions for enabling the host system 102 to communicate with and actuate various functionalities of the computing endpoint 104. In one or more embodiments, the endpoint driver includes instructions for determining whether a failure condition has occurred on the computing endpoint 104. The endpoint driver may further include instructions for how to recover the diagnostic data under various conditions. The endpoint driver may also include information indicating a location of a memory register and/or instructions for accessing mapping data to discover a location of the diagnostic data.

As further shown in FIG. 3, the computing endpoint 104 may perform an act 310 of generating and updating a memory register. For example, in addition or in conjunction with the act 304 of carving out space in memory, the computing endpoint 104 can maintain a memory register that includes mapping information. As discussed above, the mapping information may indicate a location of memory (e.g., a region of memory, a range of addresses) to indicate a portion of memory dedicated for storing diagnostic information. In one or more embodiments, the computing endpoint 104 may utilized the mapping information to determine where to perform a crash dump. In addition, the host system 102 may access the mapping data to determine where to access the memory in order to retrieve diagnostic data.

In one or more embodiments, the computing endpoint 104 establishes a base address register (BAR) that includes information for translating information between the host system 102 and the computing endpoint 104. For ex ample, in one or more implementations, performing the act 310 of generating and updating the memory register may involve receiving an address from the host system 102 indicating that communications originating from the address (e.g., the source address) may be routed (e.g., via an address translation unit positioned behind the BAR) should be directed to the set aside portion of memory.

In one or more embodiments, the memory register refers to a discoverable resource on the computing endpoint 104. In particular, in performing acts 306-310, the host system 102 may determine how to access one or more values of the memory register without requiring that the computing endpoint 104 expressly communicate data to the host system 102. In one or more embodiments, the memory register may include a discoverable value or indicator to indicate whether a failure condition exists. For instance, the discoverable value may include a flag or other indicator that a crash dump has occurred or that the computing endpoint 104 is uncertain about one or more sub-systems operating correctly. As mentioned above, the host system 102 can access the discoverable value without the computing endpoint 104 transmitting or otherwise providing data over a communication link.

As shown in FIG. 3, after carrying out the discovery process, loading the endpoint driver, and mapping the mapping information on the memory register, the host system 102 and computing endpoint 104 may perform an act 312 of carrying out normal operation. For example, the host system 102 can send and receive data to and from the computing endpoint 104 using conventional point-to-point communication techniques. In addition, the computing endpoint 104 can perform various tasks in accordance with capabilities and programming of the computing endpoint 104.

As shown in FIG. 3, at some point after initiating normal operation of the system of devices, the computing endpoint 104 may perform an act 314 of detecting a failure condition. In one or more embodiments, the computing endpoint 104 self-diagnoses a failure condition by determining that one or more components or sub-systems of the computing endpoint 104 are operating incorrectly. As another example, the computing endpoint 104 may determine that a failure condition has occurred based on outputting or detecting a value (e.g., an unexpected value) that causes the computing endpoint 104 to be uncertain whether one or more components or sub-systems are operating correctly.

In one or more embodiments, the computing endpoint 104 may perform an act 316 of generating a crash dump. In particular, in response to detecting the failure condition, the computing endpoint 104 may capture a state of memory on the computing endpoint 104. In one or more embodiments, the computing endpoint 104 captures a state of memory and generates a crash dump at a time corresponding to when the failure condition is detected. In one or more implementations, the computing endpoint 104 generates a crash dump based on a recently captures memory state corresponding to a time prior to when the failure condition occurred. In one or more embodiments, the diagnostic data includes multiple crash dumps.

While FIG. 3 illustrates a non-limiting example in which the computing endpoint 104 specifically generates a crash dump based on a detected failure condition, the computing endpoint 104 may generate a portion of diagnostic data including different types of diagnostic data. For example, in one or more implementations, the computing endpoint 104 may generate one or more portions of diagnostic data including a crash dump, memory dump, history log, or other portion of diagnostic data generated by the computing endpoint in response to one or more trigger conditions (e.g., a software or hardware failure condition).

Upon detecting the failure condition and generating the crash dump, the computing endpoint 104 can perform an act 318 of providing an interrupt signal (or other indication) to the host system 102 to indicate occurrence of the failure condition. For example, in one or more embodiments, the computing endpoint 104 provides a message signal interrupt to the host system 102 to indicate that a failure condition exists and/or that a crash dump has been created. In one or more implementations, the message signal interrupt refers to a PCIe message signal interrupt (MSI) provided to or otherwise accessible by a root complex via an in-band communication link (e.g., the PCIe communication link) between the computing endpoint 104 and the host system 102.

While one or more embodiments described herein involve the host system 102 identifying that a failure condition has occurred based on receiving some form of a notification from the computing endpoint 104, in one or more implementations, the host system 102 may discover or otherwise detect the failure condition. For example, in one or more embodiments, the host system 102 accesses a flag or value set by the computing endpoint 104 to indicate a failure condition and/or that a crash dump has been generated. For instance, the host system 102 may periodically poll the computing endpoint 104 and/or periodically access a discoverable value or resource (e.g., the memory register) that serves as an indicator that the failure condition has occurred.

In one or more embodiments, the host system 102 detects or otherwise identifies the failure condition based on observed activity of the computing endpoint 104. For example, where the computing endpoint 104 outputs an unexpected or corrupted value(s), the host system 102 may determine that a failure condition has occurred. As another example, where the computing endpoint 104 is non-responsive in some way (e.g., fails to respond to one or multiple communications from the host system 102 for a threshold period of time), the host system 102 may determine that the failure condition has occurred.

As shown in FIG. 3, in response to receiving the interrupt signal (or otherwise identifying that the failure condition exists), the host system can perform an act 320 of accessing the memory register. For instance, the host system 102 may access the memory register to identify a specific location within a memory of the computing endpoint 104 set aside for storage of the crash dump (e.g., including the diagnostic data). In one or more embodiments, the host system 102 accesses a BAR of the computing endpoint 104 and determines a specific range of memory blocks that the host system 102 can access (e.g., that the endpoint driver can access).

As shown in FIG. 3, the host system 102 can perform an act 322 of collecting or otherwise retrieving the diagnostic data. In particular, the host system 102 can receive or collect the diagnostic data over an in-band communication link (e.g., a PCIe communication link) as an alternative to a side-band channel. The host system 102 can collect the diagnostic data without requiring that the computing endpoint 104 perform any actions in connection with preparing and transmitting the data over the communication link between the respective devices.

As further shown in FIG. 3, upon collecting the diagnostic data, the host system 102 can perform an act 324 of storing the diagnostic data. For example, the host system 102 can store the diagnostic data on a local storage. The host system 102 can provide the host system 102 to another device for further analysis.

As further shown, the computing endpoint 104 may perform an act 326 of rebooting software and/or hardware of the computing endpoint 104. For example, the computing endpoint 104 may restart in order to reboot the system and correct the failure condition. In one or more embodiments, the computing endpoint 104 can perform other mitigation steps to cause the computing endpoint 104 to no longer have a failure condition or operate in a failed state. In one or more embodiments, the computing endpoint 104 may perform a specific mitigation action (e.g., software reboot, operating system reboot, hardware reboot) based on the type of failure condition detected by the host system 102 and/or computing endpoint 104. After rebooting (and re-establishing a communication link between the devices), the host system 102 and computing endpoint 104 may perform an act 328 of resuming normal operation.

Figure 4:
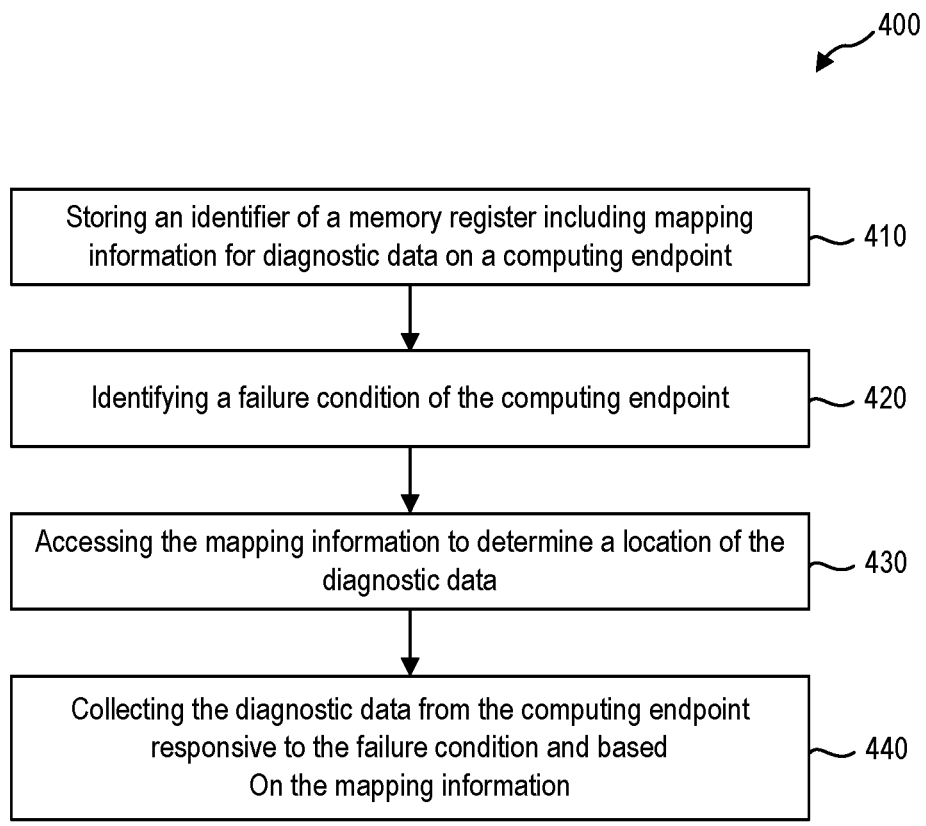
FIG. 4 illustrates an example series of acts for retrieving diagnostic information in accordance with one or more embodiments.

Turning now to FIG. 4, this figure illustrates example flowcharts including series of acts for enabling efficient access to diagnostic information responsive to an identified failure condition. While FIG. 4 illustrate acts according to one or more embodiments, alternative embodiments may omit, add to, reorder, and/or modify any of the acts shown in FIG. 4. The acts of FIG. 4 can be performed as part of a method. Alternatively, a non-transitory computer-readable medium can comprise instructions that, when executed by one or more processors, cause a computing device (e.g., input device, gaming console, client device) to perform the acts of FIG. 4. In still further embodiments, a system can perform the acts of FIG. 4.

FIG. 4 illustrates a series of acts 400 related to identifying a failure condition on a computing endpoint (e.g., a PCIe endpoint) and collecting diagnostic information in response to the failure condition. As shown in FIG. 4, the series of acts 400 may include an act 410 of storing an identifier of a memory register including mapping information for diagnostic data on a computing endpoint. For example, in one or more implementations, the act 410 involves storing, at a host system, an identifier of a memory register associated with a computing endpoint where the memory register includes mapping information indicating a memory location of diagnostic data maintained on the computing endpoint.

In one or more embodiments, the memory register includes address information for the host system. Further, the mapping information may indicate a range of memory addresses on the computing endpoint that are exposed to the host system based on a source address of the host system matching address information within the memory register.

As further shown, the series of acts 400 includes an act 420 of identifying a failure condition of the computing endpoint. For example, in one or more implementations, the act 420 includes identifying a failure condition of the computing endpoint associated with collecting the diagnostic data from the computing endpoint. In one or more embodiments, identifying the failure condition includes detecting that the computing endpoint is non-responsive to one or more communications from the host system. In addition, or as an alternative, in one or more implementations, identifying the failure condition includes receiving an interrupt signal from the computing endpoint indicating availability of a crash dump on the computing endpoint at the memory location corresponding to the mapping information As further shown, the series of acts 400 includes an act 430 of accessing the mapping information to determine a location of the diagnostic data. For example, in one or more implementations, the act 430 involves, in response to identifying the failure condition of the computing endpoint, accessing the mapping information associated with the identifier of the memory register.

As further shown, the series of acts 400 includes an act 440 of collecting the diagnostic data from the computing endpoint responsive to the failure condition and based on the mapping information. For example, in one or more embodiments, the act 440 involves collecting the diagnostic data from the computing endpoint based on the mapping information included within the memory register on the computing endpoint. In one or more embodiments, collecting the diagnostic data includes causing a root complex on the host system to retrieve the diagnostic data from the indicated memory location without providing a request to the computing endpoint for the diagnostic data.

In one or more embodiments, the computing endpoint includes a PCIe endpoint. Further, in one or more implementations, the host system and the computing endpoint are coupled via a PCIe communication link. In one or more implementations, collecting the diagnostic data from the computing endpoint (e.g., the PCIe endpoint) includes receiving the diagnostic data via the PCIe communication link.

In one or more implementations, the series of acts 400 includes configuring an endpoint-specific driver on the host system. The endpoint-specific driver may include instructions associated with identifying the failure condition and collecting the diagnostic data in response to identifying the failure condition.

In one or more implementations, the computing endpoint includes one or more of a graphics processing unit (GPU), a storage controller, a network adapter, or a processing accelerator. Further, in one or more implementations, the series of acts 400 includes storing, at a host system, a plurality of identifiers of a plurality of memory registers on a plurality of computing endpoints. The plurality of memory registers may include mapping information indicating memory locations of diagnostic data maintained on respective computing endpoints of the plurality of computing endpoints.

Figure 5:
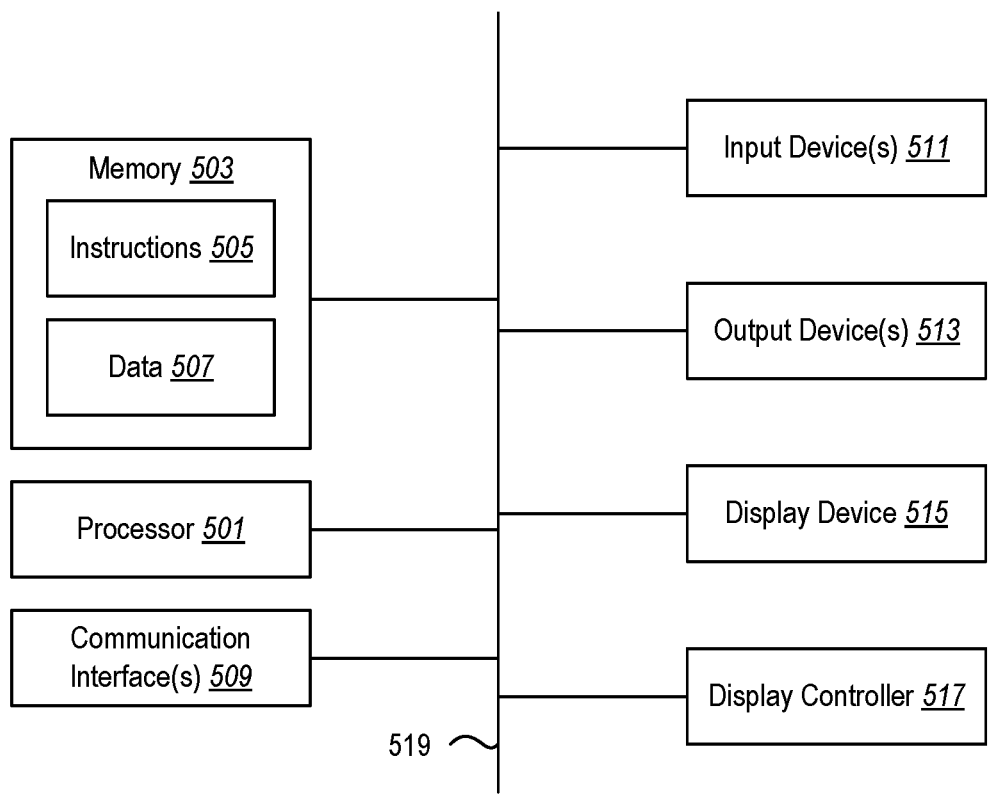
FIG. 5 illustrates certain components that may be included within a computer system.

FIG. 5 illustrates certain components that may be included within a computer system 500. One or more computer systems 500 may be used to implement the various devices, components, and systems described herein.

The computer system 500 includes a processor 501. The processor 501 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   storing, at a host system, an identifier of a memory register associated with a computing endpoint, the memory register including mapping information indicating a memory location of diagnostic data maintained on the computing endpoint;
   identifying a failure condition of the computing endpoint associated with collecting the diagnostic data from the computing endpoint;
   in response to identifying the failure condition of the computing endpoint, accessing the mapping information associated with the identifier of the memory register; and
   collecting the diagnostic data from the computing endpoint based on the mapping information included within the memory register on the computing endpoint, wherein collecting the diagnostic data comprises causing a root complex on the host system to retrieve the diagnostic data from the indicated memory location without providing a request to the computing endpoint for the diagnostic data.

2. The method of claim 1, wherein the computing endpoint comprises a peripheral component interconnect express (PCIe) endpoint.

3. The method of claim 1, wherein the host system and the computing endpoint are coupled via a peripheral component interconnect express (PCIe) communication link, and wherein collecting the diagnostic data from the computing endpoint includes receiving the diagnostic data via the PCIe communication link.

4. The method of claim 1, wherein identifying the failure condition comprises detecting that the computing endpoint is non-responsive to one or more communications from the host system.

5. The method of claim 1, wherein identifying the failure condition comprises receiving an interrupt signal from the computing endpoint indicating availability of a crash dump on the computing endpoint at the memory location corresponding to the mapping information.

6. The method of claim 1, further comprising configuring an endpoint-specific driver on the host system, the endpoint-specific driver including instructions associated with:
   identifying the failure condition; and collecting the diagnostic data in response to identifying the failure condition.

7. The method of claim 1, wherein the memory register further includes address information for the host system, and wherein the mapping information indicates a range of memory addresses on the computing endpoint that are exposed to the host system based on a source address of the host system matching address information within the memory register.

8. The method of claim 1, wherein the computing endpoint comprises one or more of a graphics processing unit (GPU), a storage controller, a network adapter, or a processing accelerator.

9. The method of claim 1, further comprising storing, at the host system, a plurality of identifiers of a plurality of memory registers on a plurality of computing endpoints, the plurality of memory registers including mapping information indicating memory locations of diagnostic data maintained on respective computing endpoints of the plurality of computing endpoints.

10. A system, comprising:
one or more processors;
memory in electronic communication with the one or more processors; and
instructions stored in the memory, the instructions being executable by the one or more processors to cause a host system to:
store an identifier of a memory register associated with a computing endpoint, the memory register including mapping information indicating a memory location of diagnostic data maintained on the computing endpoint;
identify a failure condition of the computing endpoint associated with collecting the diagnostic data from the computing endpoint;
in response to identifying the failure condition of the computing endpoint, access the mapping information associated with the identifier of the memory register; and
collect the diagnostic data from the computing endpoint based on the mapping information included within the memory register on the computing endpoint, wherein collecting the diagnostic data comprises causing a root complex on the host system to retrieve the diagnostic data from the indicated memory location without providing a request to the computing endpoint for the diagnostic data.

11. The system of claim 10, wherein the computing endpoint comprises a peripheral component interconnect express (PCIe) endpoint, wherein the host system and the PCIe endpoint are coupled via a PCIe communication link, and wherein collecting the diagnostic data from the computing endpoint includes receiving the diagnostic data via the PCIe communication link.

12. The system of claim 10, wherein identifying the failure condition comprises one or more of:
detecting that the computing endpoint is non-responsive to one or more communications from the host system; or
receiving an interrupt signal from the computing endpoint indicating availability of a crash dump on the computing endpoint at the memory location corresponding to the mapping information.

13. The system of claim 10, wherein the memory register further includes address information for the host system, and wherein the mapping information indicates a range of memory addresses on the computing endpoint that are exposed to the host system based on a source address of the host system matching address information within the memory register.

14. A non-transitory computer readable medium storing instructions thereon that, when executed by one or more processors on a host system, cause the host system to:
store an identifier of a memory register associated with a computing endpoint, the memory register including mapping information indicating a memory location of diagnostic data maintained on the computing endpoint;
identify a failure condition of the computing endpoint associated with collecting the diagnostic data from the computing endpoint;
in response to identifying the failure condition of the computing endpoint, access the mapping information associated with the identifier of the memory register; and
collect the diagnostic data from the computing endpoint based on the mapping information included within the memory register on the computing endpoint, wherein collecting the diagnostic data comprises causing a root complex on the host system to retrieve the diagnostic data from the indicated memory location without providing a request to the computing endpoint for the diagnostic data.

15. The non-transitory computer readable medium of claim 14, wherein the computing endpoint comprises a peripheral component interconnect express (PCIe) endpoint, wherein the host system and the PCIe endpoint are coupled via a PCIe communication link, and wherein collecting the diagnostic data from the computing endpoint includes receiving the diagnostic data via the PCIe communication link.

16. The non-transitory computer readable medium of claim 14, wherein identifying the failure condition comprises one or more of:
detecting that the computing endpoint is non-responsive to one or more communications from the host system; or
receiving an interrupt signal from the computing endpoint indicating availability of a crash dump on the computing endpoint at the memory location corresponding to the mapping information.

17. The non-transitory computer readable medium of claim 14, wherein the memory register further includes address information for the host system, and wherein the mapping information indicates a range of memory addresses on the computing endpoint that are exposed to the host system based on a source address of the host system matching address information within the memory register.

* * * * *